Feb. 19, 1924.
M. A. HOLTZBAUER
1,484,266
CLUTCH PEDAL MECHANISM FOR AUTOMOBILES
Filed May 24, 1922   3 Sheets-Sheet 1
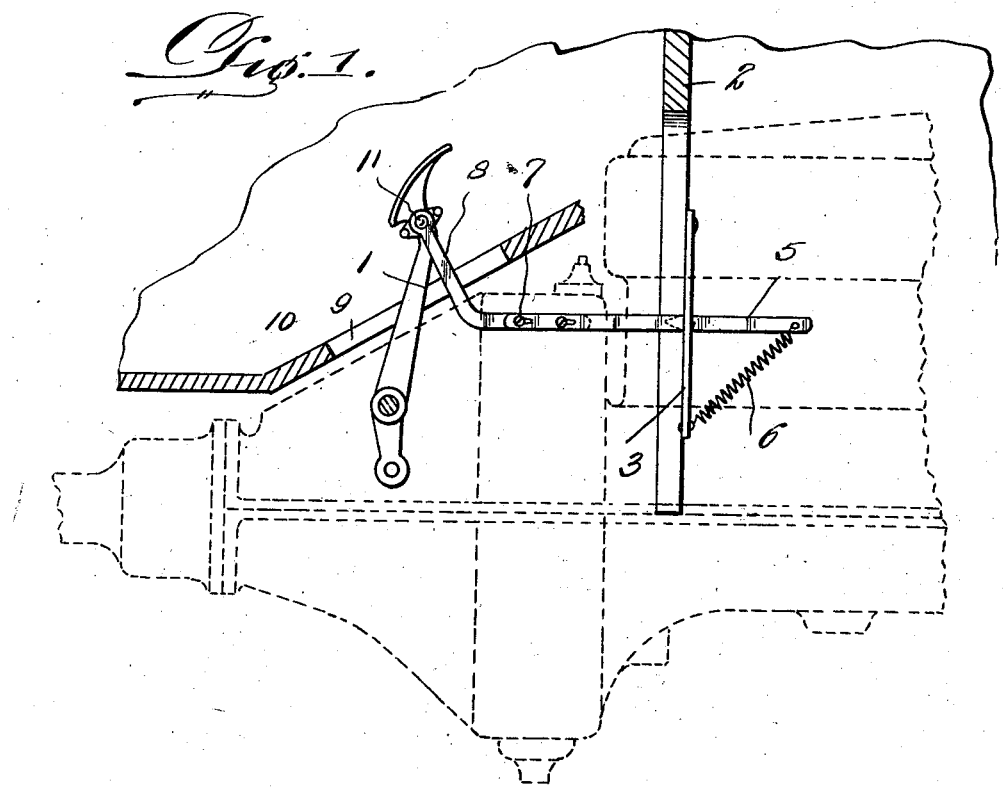
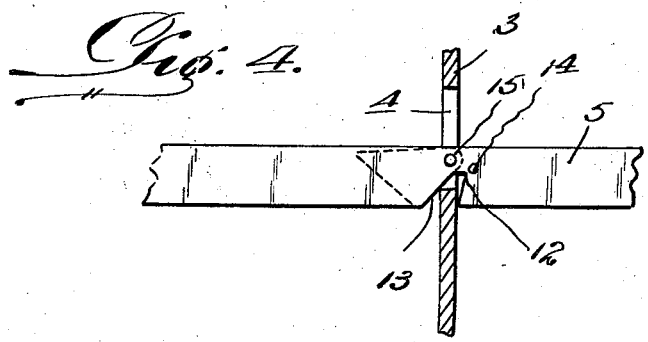

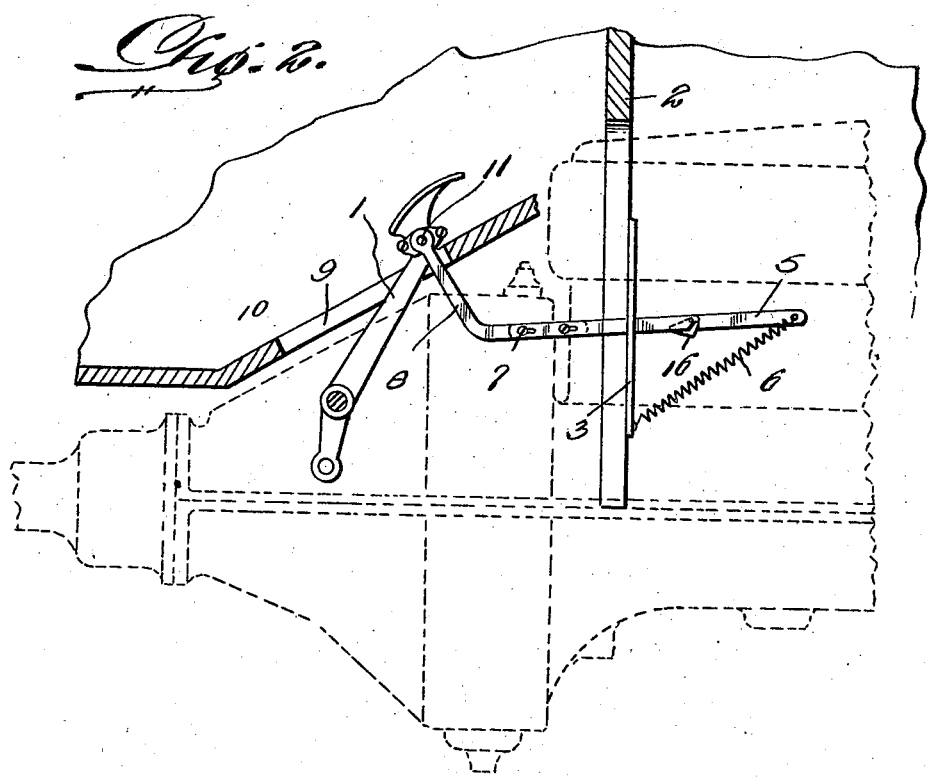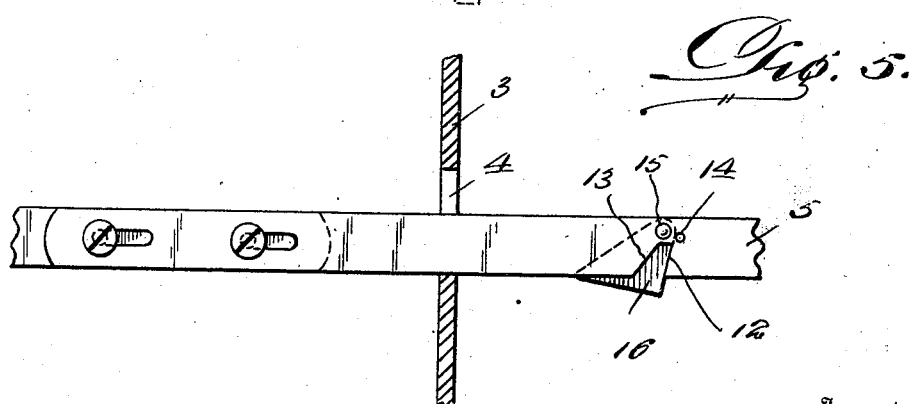

Feb. 19, 1924.  
M. A. HOLTZBAUER  
1,484,266  
CLUTCH PEDAL MECHANISM FOR AUTOMOBILES  
Filed May 24, 1922   3 Sheets-Sheet 3
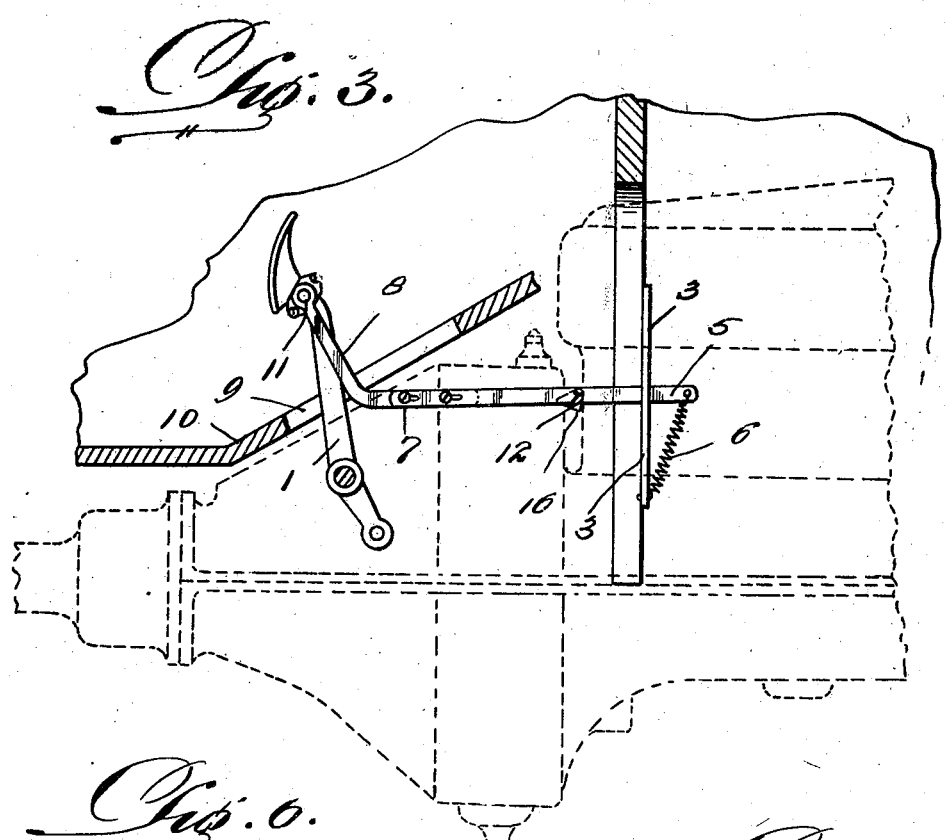
Fig. 3.
Fig. 6.  
Fig. 7.
Witnesses:  
F. L. Fox  
H. Barman
Inventor  
M. A. Holtzbauer,  
By Clarence A. O'Brien  
Attorney Patented Feb. 19, 1924.

1,484,266

UNITED STATES PATENT OFFICE.

MATHIAS A. HOLTZBAUER, OF BELMOND, IOWA.

CLUTCH-PEDAL MECHANISM FOR AUTOMOBILES.

Application filed May 24, 1922. Serial No. 563,356.

*To all whom it may concern:*

Be it known that I, MATHIAS A. HOLTZBAUER, a citizen of the United States, residing at Belmond, in the county of Wright and State of Iowa, have invented new and useful Improvements in Clutch-Pedal Mechanism for Automobiles, of which the following is a specification.

The object of my said invention is the provision of a simple, durable and reliable mechanism through the medium of which an automobile, more particularly a Ford automobile can be changed from neutral to low speed and again changed from low speed to neutral or high speed through the medium of the clutch pedal, thereby eliminating entirely a high speed lever for operating the gears of the automobile.

To the attainment of the foregoing, the invention consists in the improvement as hereinafter described and definitely claimed.

In the accompanying drawings, forming part of this specification:—

Figure 1 is a view showing my improvement in neutral position as associated with the clutch pedal of a Ford automobile.

Figure 2 is a view similar to Figure 1 but showing the parts in low speed position.

Figure 3 is a similar view showing the parts in high speed position.

Figure 4 is an enlarged detail view with the thrust bar held against rearward movement by the bracket.

Figure 5 is an enlarged detail view with the thrust bar in the same position as in Figure 2.

Figure 6 is an enlarged perspective of the apertured bracket of my improvement.

Figure 7 is an enlarged perspective of the dog comprised in the improvement.

Similar numerals designate corresponding parts in all of the views of the drawings.

In accordance with my invention I employ a clutch pedal 1 which may be and preferably is the ordinary clutch pedal, though it is not necessary for the same to have any connection with the high speed lever before alluded to. Also in accordance with my invention I employ in fixed relation to a frame 2 of the machine a bracket 3 that is arranged in front of the clutch pedal 1 and is apertured as indicated by 4.

Extending through the aperture 4 of the bracket 3 which is designed to serve as a keeper is a thrust or latch bar 5 between the forward end portion of which and the lower end of the bracket or keeper 3 is interposed a retractile spring 6. In virtue of the arrangement shown in Figures 1, 2 and 3 it will be observed that the said spring 6 tends to draw the bar 5 downwardly and also tends to move the said bar 5 rearwardly. The bar 5 is connected at 7, preferably in adjustable manner to a bar 8 that extends through and is adapted to play in the opening 9 of the foot board 10, and is pivotally connected at 11 to the upper portion of the clutch pedal 1. In its lower edge and at an intermediate point of its length the thrust bar 5 is provided with a notch 12, the rear wall 13 of which is inclined considerably from the vertical as best shown in Figure 5. On the thrust bar 5 adjacent to the notch 12 is a lateral pin 14, and pivotally connected at 15 to the thrust bar 5 is a gravitational dog 16 shaped and relatively arranged as illustrated.

In Figure 1 the clutch pedal 1 is shown in neutral position, and by reference to Figures 1 and 4 it will be observed that with the pedal 1 in said position, the pedal can be changed to the low gear position as shown in Figure 2 and can be changed back to the neutral position of Figure 1 or can be changed to high speed position, Figure 3, by simply actuating the clutch pedal 1. This will be better understood when it is stated that with the thrust bar 5 positioned as in Figure 4, forward movement of the thrust bar 5 will be attended by upward movement of said thrust bar 5 to disengage the forward wall of the notch 12 from the keeper 4, whereupon the tendency of the spring 6 to contract will snap the thrust bar 5 and the clutch pedal rearwardly to the position as shown in Figure 3. Again with the parts positioned as shown in Figure 1 forward movement of the clutch pedal 1 will be attended by free forward movement of the thrust bar 5 into the position shown in Figure 2. When the parts are positioned as shown in Figures 2 and 5, and the clutch pedal 1 is relieved of pressure it will be understood that the spring (not shown) that is usually associated with the clutch pedal 1, will move the clutch pedal rearwardly to the position shown in Figure 3. The rearward movement of the thrust bar 5 and the dog 16 being attended by the riding of the lower edge of the dog 16 over the lower wall of the aperture 4 in the keeper or bracket plate 3. In this connection it will be understood that the pin 14 has for its function to limit the downward and forward movement of the dog 16 so that the said dog cannot gravitate below the position shown in Figure 5.

Notwithstanding the practical advantages ascribed to my improvement it will be apparent that the improvement is simple and inexpensive in construction and is susceptible of being readily applied to automobiles, more particularly Ford automobiles, such as at present in use.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters Patent, is:—

The combination with the foot lever of an automobile, of a thrust bar, having one end pivotally connected therewith, a plate supported forwardly of the thrust bar and having a slot thereon, the bar being provided with a V-shaped notch adapted to receive one edge of the plate at predetermined times and a triangular shaped latch element pivoted in the notch adapted to close the notch at times to cause the notch to ride over the plate and a contractile spring having one end secured to the thrust bar and its opposite end connected to the plate.

In testimony whereof I affix my signature.

MATHIAS A. HOLTZBAUER.